United States Patent
Webster, Jr. et al.

(10) Patent No.: US 7,840,436 B1
(45) Date of Patent: Nov. 23, 2010

(54) SECURE DATA WAREHOUSE MODELING SYSTEM UTILIZING AN OFFLINE DESKTOP OR LAPTOP COMPUTER FOR DETERMINING BUSINESS DATA WAREHOUSE REQUIREMENTS

(75) Inventors: Thomas A. Webster, Jr., Springboro, OH (US); Robert J. Davis, Mason, OH (US); Angela N. Knell, Louisville, KY (US)

(73) Assignee: Teradata US, Inc., Miamisburg, OH (US)

( * ) Notice: Subject to any disclaimer, the term of this patent is extended or adjusted under 35 U.S.C. 154(b) by 2778 days.

(21) Appl. No.: 10/215,606

(22) Filed: Aug. 9, 2002

Related U.S. Application Data

(60) Provisional application No. 60/334,189, filed on Nov. 29, 2001.

(51) Int. Cl.
*G06F 17/30* (2006.01)
*G07G 1/00* (2006.01)

(52) U.S. Cl. .......................................... 705/10; 705/7

(58) Field of Classification Search ................ 705/10
See application file for complete search history.

(56) References Cited

U.S. PATENT DOCUMENTS

| | | | |
|---|---|---|---|
| 6,219,654 B1 * | 4/2001 | Ruffin | 705/400 |
| 6,341,287 B1 * | 1/2002 | Sziklai et al. | 707/102 |
| 6,557,008 B1 * | 4/2003 | Temple et al. | 707/104.1 |
| 2002/0023074 A1 * | 2/2002 | Miller et al. | 707/1 |
| 2003/0055718 A1 * | 3/2003 | Cimini et al. | 705/11 |

OTHER PUBLICATIONS

Stanton et al, Using Internet/Intranet Web pages to collect organizational research data, Organizational Research Methods, v4n3, pp. 200-217, Jul. 2001. Dialog File 15.*

* cited by examiner

*Primary Examiner*—Andre Boyce
(74) *Attorney, Agent, or Firm*—James Stover, Attorney

(57) ABSTRACT

A modeling tool for determining the impact that a data warehouse solution will have upon a business organization considering implementing a data warehouse solution. The modeling tool is implemented on a server computer with restricted access through a client computer. A server computer includes: a business impact model comprising a mathematical representation of a data warehouse solution, and an assessment questionnaire; and a modeling application for calculating a value of a data warehouse solution to a business organization from the business impact model and assessment questionnaire answers. A client computer is connectable to the server computer for receiving a copy of the business impact model, and providing offline collection of answers to the assessment questions, and offline calculation of a value of the data warehouse solution to the business organization. An application residing on the server computer keeps a record of the business impact model received by the client computer.

18 Claims, 8 Drawing Sheets

(7.1) SALESMAN WORKING OFF-LINE

OFF-LINE

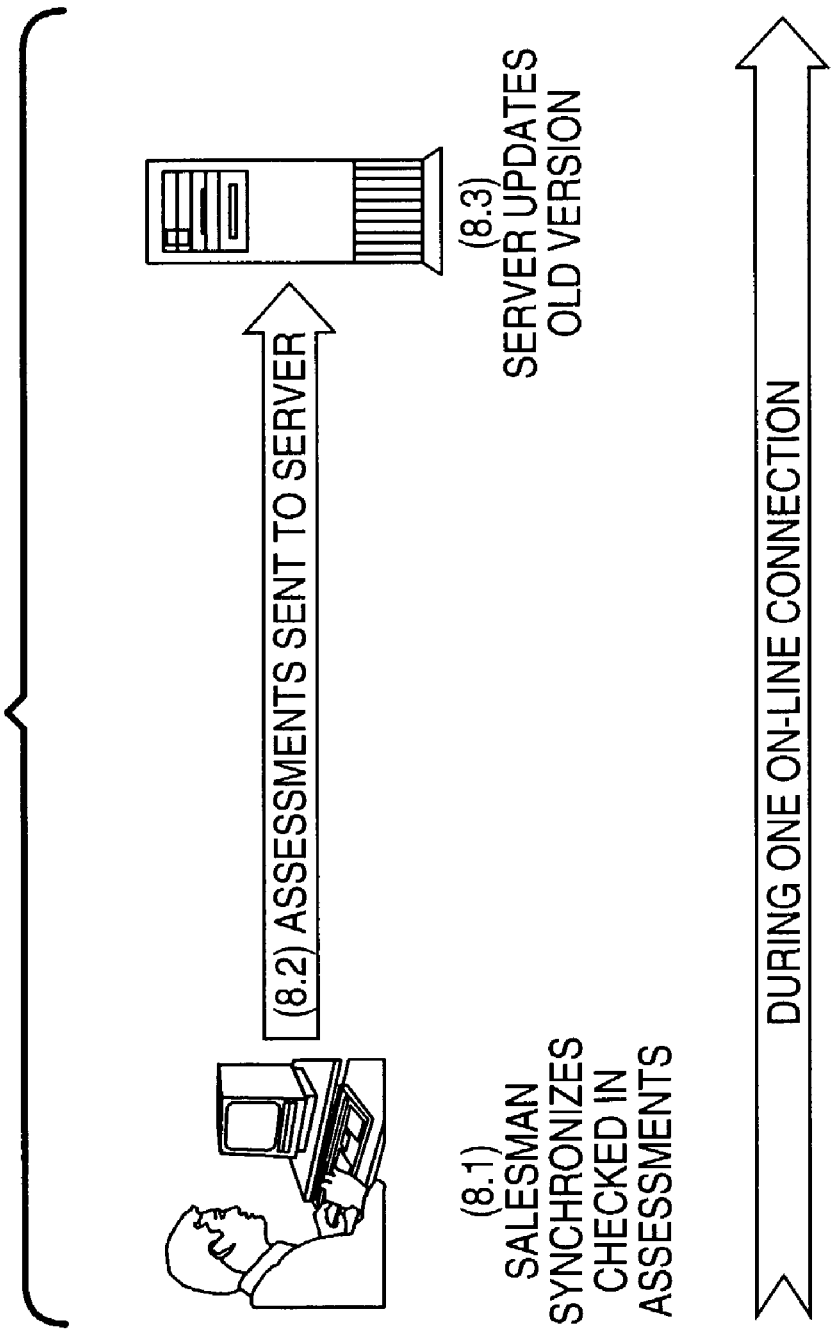

SECURE DATA WAREHOUSE MODELING SYSTEM UTILIZING AN OFFLINE DESKTOP OR LAPTOP COMPUTER FOR DETERMINING BUSINESS DATA WAREHOUSE REQUIREMENTS

CROSS REFERENCE TO RELATED APPLICATIONS

This application claims priority under 35 U.S.C. §119(e) to the following and commonly-assigned patent application:

Provisional Application Ser. No. 60/334,189, entitled "BUSINESS IMPACT MODELING TOOL," filed on Nov. 29, 2001;

which application is incorporated by reference herein.

This application is related to the following co-pending and commonly assigned patent application:

Utility application Ser. No. 10/215,631, entitled "SECURE DATA WAREHOUSE MODELING SYSTEM UTILIZING A PERSONAL DIGITAL ASSISTANT FOR DETERMINING BUSINESS DATA WAREHOUSE REQUIREMENTS," filed on same date herewith, by Thomas A. Webster, Jr., Robert J. Davis, and Nichole Knell;

which application is incorporated by reference herein.

FIELD OF THE INVENTION

The present invention relates generally to data warehouse solutions, and more particularly, to systems and methods for assessing and predicting data warehouse solution requirements for a business or organization implementing a data warehouse solution. Still more particularly, the present invention is related to a modeling tool for determining the impact that a data warehouse solution will have upon a business or organization considering implementing a Data Warehouse solution.

BACKGROUND OF THE INVENTION

Teradata, a division of NCR Corporation, offers powerful analytical solutions that help businesses drive growth. Teradata solutions include the Teradata warehouse, along with analytical applications for customer relationship management, operations/financial management, business performance management and e-business.

NCR Corporation has developed a tool, the Business Impact Modeling (BIM) system, which provides salespeople with the ability to determine the "impact" that an NCR solution will have upon a prospective customer. The ability to do so rests on using the system to distribute and evaluate "business impact models", or BIMs—complex mathematical representations of NCR solutions. Numerous BIMs may be created for different NCR solutions for different industries, such as retail, e-business, travel, financial, insurance, manufacturing, etc.

The BIM tool can be utilized by a solution provider to enhance understanding of a customer's key business drivers and challenges, to aid in the preparation for the opportunity assessments or bid reviews, to uncover other solution opportunities, determine solution impact on a customer's bottom line, and to shorten the sales cycle.

Built by business analysts using Microsoft Excel® spreadsheets, BIMs are largely treated as "black boxes" by the system and the sales force. A salesperson simply collects pertinent information about a customer, typically in response to questions included with a selected business impact model, and feeds it into the system. The system inserts the collected information into well-identified cells of a BIM spreadsheet, allows Excel to perform the math, and then retrieves the calculated outputs from other well-identified cells of the BIM spreadsheet.

The BIM system is implemented as a server-based web application, and only the process of collecting answers and presenting results is done on a user's own PC. The remaining steps in the process, e.g., providing input to and pulling outputs from the BIM spreadsheets, are performed on the web server.

As a result, the intellectual property represented by the BIM spreadsheets never leaves NCR's premises, and cannot be compromised. Moreover, since working with a BIM involves interacting with the server, all BIM activity can be monitored at this single point, with an eye toward ensuring that it serves a bona fide sales opportunity. These characteristics provide NCR management with good control over the exposure and use of its intellectual property.

However, the BIM system does not provide the sales force with any ability to work with BIMs unless they are connected to the BIM server. Since some salespeople routinely work in situations where making a connection with the BIM system is impossible or impractical, the benefits that the BIM system can provide may be limited.

To better enable the use of the BIM system among infrequently online salespeople, an extension to the BIM system that allows users to run BIM assessments on their disconnected desktops and laptops has been developed. This system will allow members of the salesforce to make much greater use of the BIM system while off-line, while still taking prudent measures to protect the valuable customer information collected and calculated by the BIM system.

OBJECTS OF THE INVENTION

It is an object of the present invention to provide a new and useful system and method for assessing and predicting data warehouse solution requirements for a business or organization implementing a data warehouse solution.

It is a further object of the present invention to provide such a system and method implemented on a secure computer system including the capability to collect customer information and perform assessments on an offline desktop or notebook computer.

It is also an object of the present invention to provide a new and useful modeling tool for determining the impact that a data warehouse solution will have upon a business or organization considering implementing a Data Warehouse solution.

SUMMARY OF THE INVENTION

There is provided, in accordance with the present invention, a modeling tool for determining the impact that a data warehouse solution will have upon a business organization considering implementing a data warehouse solution. The Business Impact Modeling tool, or BIM tool, is implemented on a server computer with restricted access through a client computer. The method of the present invention includes the steps of (1) at the server computer, providing at least one business impact model comprising a mathematical representation of a data warehouse solution, the business impact model including an assessment questionnaire including a plurality of questions relating to the business organization considering implementing a data warehouse solution; (2) at the server computer, providing a business impact modeling application for calculating a value of the data warehouse solution to the business organization from said business impact model and answers provided to said assessment questions; (3) connecting a client computer through a communication network to the server computer and downloading a copy of the business impact model to the client computer; (4) maintaining at said server computer a record of copies of the business impact model received by the client computer; and (5) at the client computer, while the client computer is unconnected from the communication network and server computer, collecting answers to the assessment questions and calculating the value of the data warehouse solution to the business organization from the copy of the business impact model and the answers provided to the assessment questions.

In the preferred embodiment, the client computer communicates with BIM application and server computer through a web browser application. Additionally, communication between the client computer and server computer is restricted by a security application that limits access to the business impact modeling application and business impact models to selected users.

The value of the data warehouse solution calculated by the business impact modeling application may include a revenue enhancement estimate, an expense reduction estimate, a gross margin improvement estimate, a profit improvement estimate, or a return on investment estimate.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by, way of example, and not by limitation, in the Figures of the accompanying drawings, wherein elements having the same reference numeral designations represent like elements throughout and wherein:

FIG. 8 illustrates the process for uploading a modified, checked-out assessment to the BIM server in accordance with the present invention.

DETAILED DESCRIPTION OF THE PREFERRED EMBODIMENT

BIM On-Line System Overview

Figure 1:
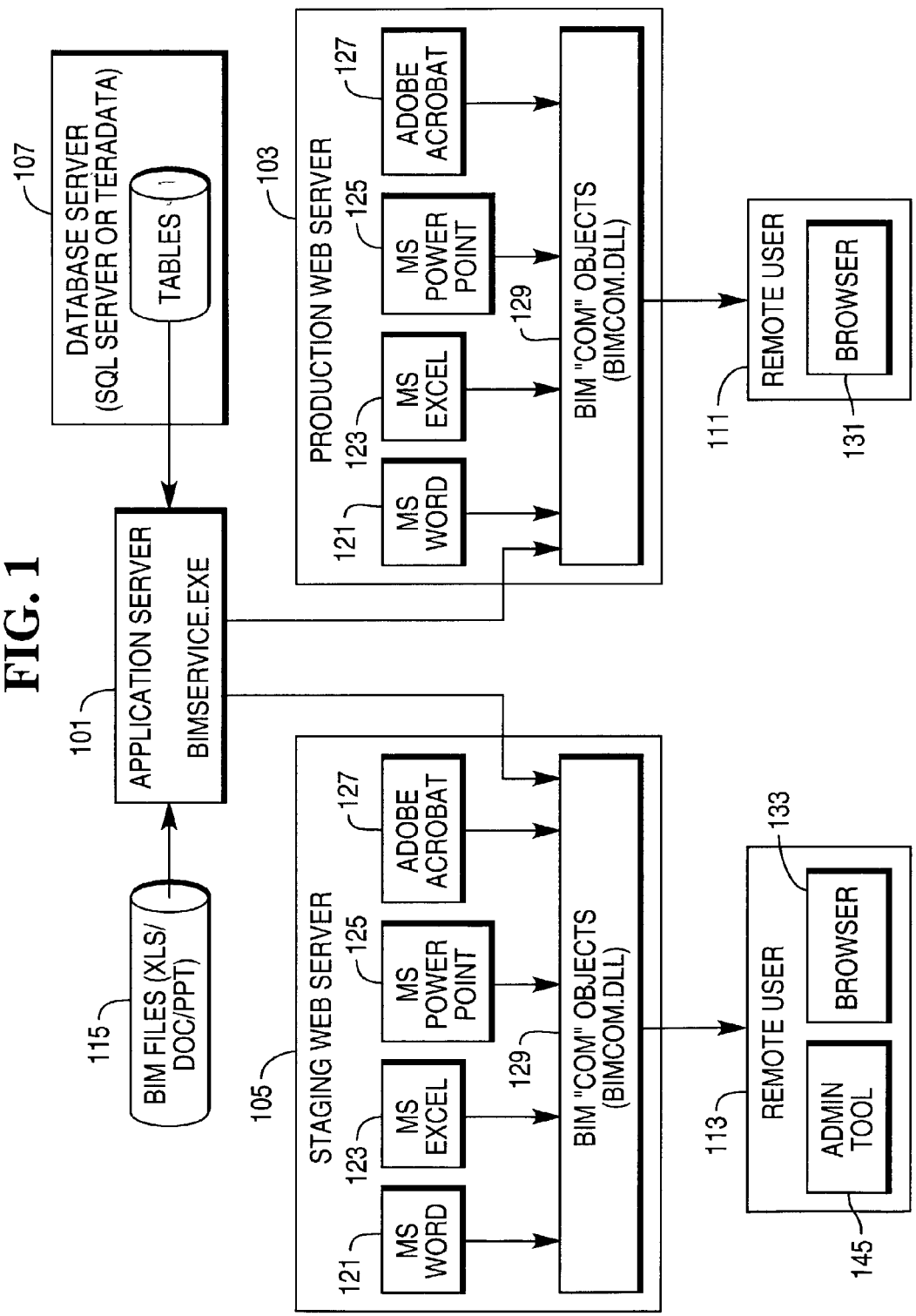
FIG. 1 provides an overview of the hardware and software components required for implementation of a Business Impact Modeling (BIM) system.
Figure 2:
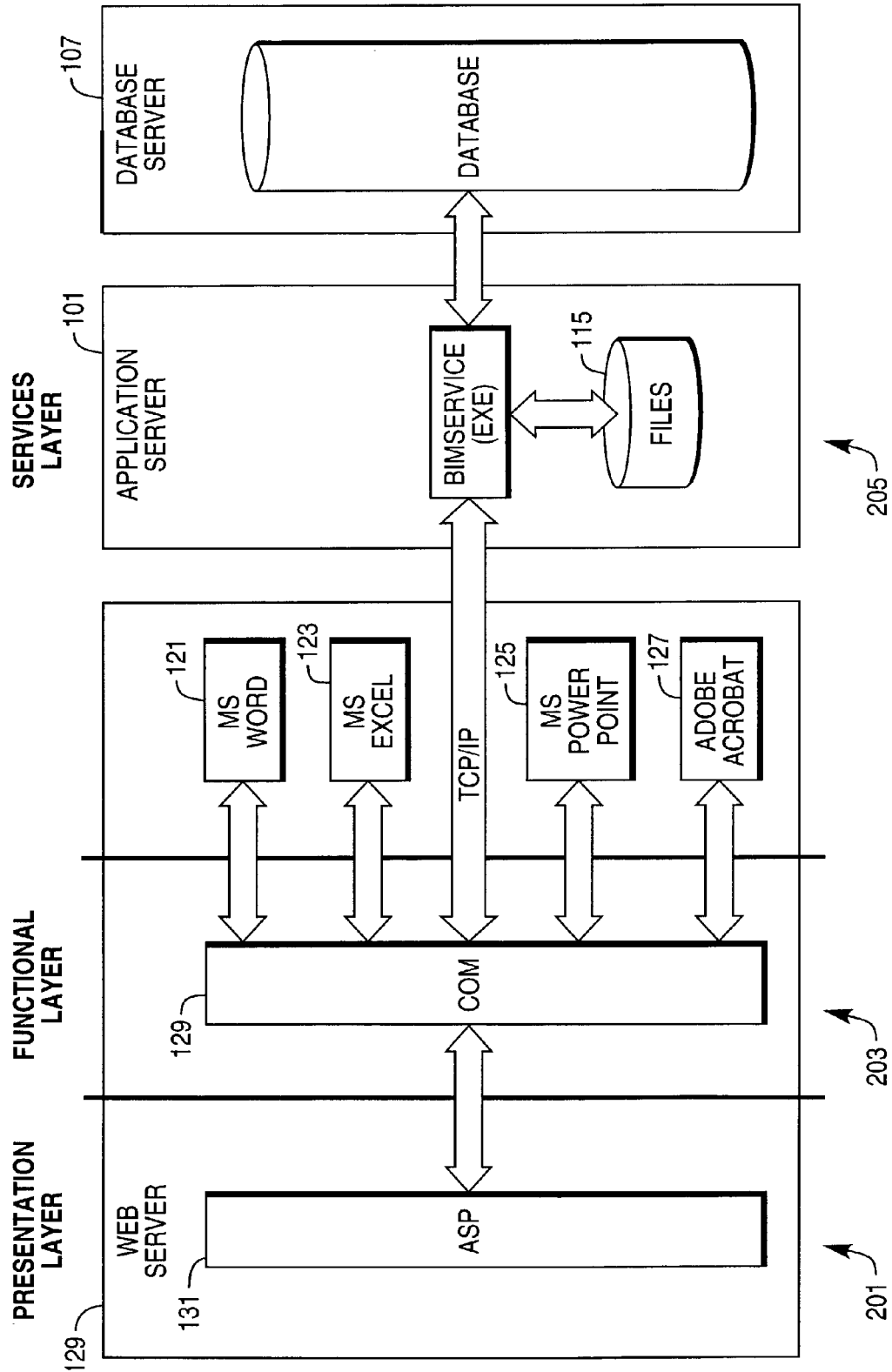
FIG. 2 provides an alternative view of the Business Impact Modeling (BIM) system, with the BIM web application shown divided into three distinct layers.

FIGS. 1 and 2 provide an overview of the hardware and software components required for implementation of a web-based Business Impact Modeling (BIM) system. The basic components of the BIM system consist of four logical servers: an Application Server 101, a Production Web Server 103, a Staging Web Server 105, and a Database Server 107. User interaction with the BIM system occurs through workstations 111 and 113 interfacing with web servers 103 and 105.

The business impact models consist of Excel, Word and PowerPoint documents 115. Application Server 101 coordinates activities of both web servers and provides access to the stored BIM files (XLS, DOC, etc) 115 used by the Staging and Production web servers. Note that these files are NOT shared; all access to them is via request made to Application Server 101 from the web servers 103 and 105. The BIM system will use these Excel, Word and PowerPoint documents directly, dynamically generating corresponding web pages at run-time, eliminating the need for a developer to translate them into another format.

Application Server 101, Production Web Server 103 and Database Server 107 may all be run on one physical machine if necessary. However, the two web servers 103 and 105 are completely independent from each other and for technical reasons must be on different physical machines. The Staging Web Server 105 which is used to test BIM elements prior to being released onto Production Web Server 103, need not be housed on a physical machine server that is mission-critical.

The Production and Staging Web Servers 103 and 105 that house BIM systems include the following applications: Internet Information Server 4.0 or higher; Microsoft Word 121; Microsoft Excel 123; Microsoft PowerPoint 125; and Adobe Acrobat 127. Use of these standard desktop applications provides the BIM administrator with the ability to create and update business impact models without intervention of a developer and ensures that no discrepancies between intended and actual models occur during the process of publishing a business impact model to the BIM system. Web Servers 103 and 105 also include BIM COM (Component Object Model) objects 129 and ASP (Active Server Pages) components 131.

BIM COM objects 129 functions as an intermediary between Application Server 101, the desktop applications (Word, Excel, and PowerPoint) and ASP components 131.

An Active Server Page (ASP) component is an HTML page that includes one or more, scripts, small, embedded programs, that are processed on the web server before the page is sent to the user. Typically, the script in the web page at the server uses input received as the result of the user's request for the page to access data from a database and then builds or customizes the page on-the-fly before sending it to the requestor.

An administration tool 145 is also provided, via which requests can be made of the BIM Application Server 101 to update information on the web servers and the database server. Administrative tool 145 can be run on any user workstation. Through it, an administrator can update BIM spreadsheets and document files on the central Application Server, information within the database that supports both web servers, and perform other administrative procedures, some of which are discussed below.

FIG. 2 provides an alternate view of the BIM web application. Referring to FIG. 2, the BIM web application is shown divided into three distinct layers:

- The Presentation layer 201 houses the entire BIM system user interface.
- The Functional layer 203 houses the core of the BIM system functions and functions as an intermediary between the Presentation and Services layers.
- The Services layer 205 consists of the applications and database interfaces that the BIM system will leverage.

The Presentation layer has been developed in Active Server Pages, while the Functional layer has been implemented as COM objects developed using C++ and the Microsoft Foundation Class library.

A user interacts with the BIM system through a web browser 131 to provide answers to a series of questions concerning a customer's business and potential data warehouse purchase requirements or considerations. The BIM system provides calculated projections that express the quantified value of a specific technology in the customer's performance measures. As a tool, the BIM system provides a framework with which the solution provider and customer can jointly develop a mutually agreed upon prediction of a technology's quantified impact. The impact can be quantified in terms of business function and process improvements resulting in revenue enhancement, expense reduction, and gross margin/profit improvements. Generally, a BIM study, or assessment, includes process analysis, estimated technology acquisition costs, expected annualized benefits, complete investment financial analysis, and a look at the qualitative, or "soft" benefits. The BIM report provides the customer with an objective assessment of the return on investment they can expect from the implementation of a specific technology.

Figure 3:
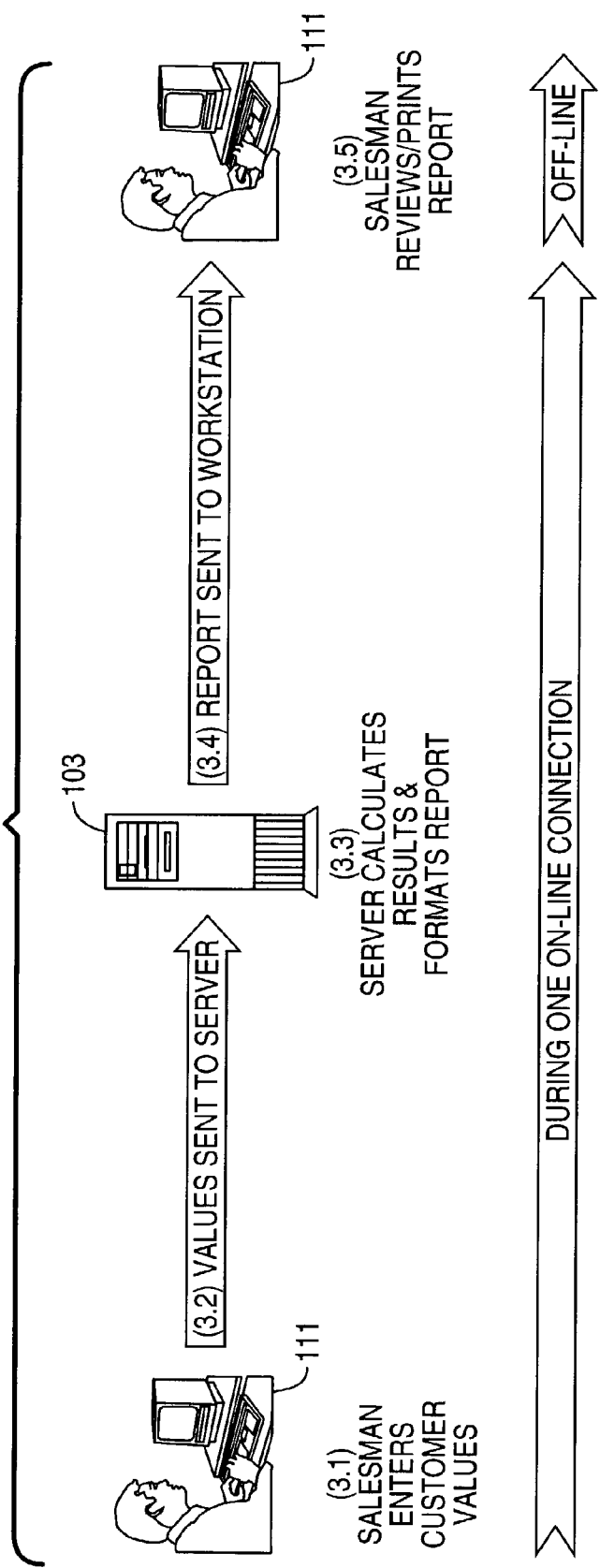
FIG. 3 provides an illustration of the process for entering a BIM assessment into the online BIM system and generating a business impact report.

In the web-based, on-line system, all activities take place sequentially while the user is connected. This process is illustrated in FIG. 3. Specifically, the salesperson or BIM user must connect to the BIM system and while online enter customer values in response to assessment questions (step 3.1) at the user's desktop computer 111. The entered values are then sent to the BIM server 103 (step 3.2). The BIM server calculates results and prepares a BIM assessment report (step 3.3) which is sent back to the online user's desktop computer 111 (step 3.4). Once a BIM assessment has been completed and a report generated, the user may review and print the report results offline, i.e., without being connected to the BIM system (step 3.5).

Figure 4:
FIG. 4 provides an illustration of the web browser interface window as presented to at a user at a workstation connected to the online BIM system.

FIG. 4 provides an illustration of the web browser interface window 401 as presented to at a user at a workstation connected to the BIM system. Within the interface window presented by the BIM application, a series of questions 403 concerning a customer's business and potential data warehouse purchase requirements or considerations are illustrated.

Figure 5:
FIG. 5 provides an illustration of one report format for presenting business impact results to a user through the web browser interface with the BIM online system.

An illustration of one manner of reporting the assessment results 405 calculated in response to inputting answers to the questions shown in FIG. 4 into the BIM system is shown in FIG. 5.

The BIM system, as described to this point, does not provide a member of the sales force with any ability to work with BIM assessments unless the user is connected to the BIM server. Since some salespeople routinely work in situations where making a connection with the BIM system is impossible or impractical the benefits that the BIM system, as described above, can provide are limited.

Offline BIM Desktop System Description

Utilizing the BIM online system, a salesperson is often required to obtain information from their customer offline for input into the BIM system. This process may require that the salesperson print out a questions form, enter handwritten answers obtained from the customer to the questions on the printed form, and transcribe the answers back into the BIM system at a later time while online.

The system described herein, referred to as "Desktop BIM", provides a desktop or laptop user with the capability to integrate with the BIM system to download assessment questions, capture customer metrics, calculate BIM results and review BIM assessment reports while offline. This replaces the manual procedure, which involves printing a questions form, filling it out with a customer, and then transcribing the answers back into the BIM online system.

Figure 6:
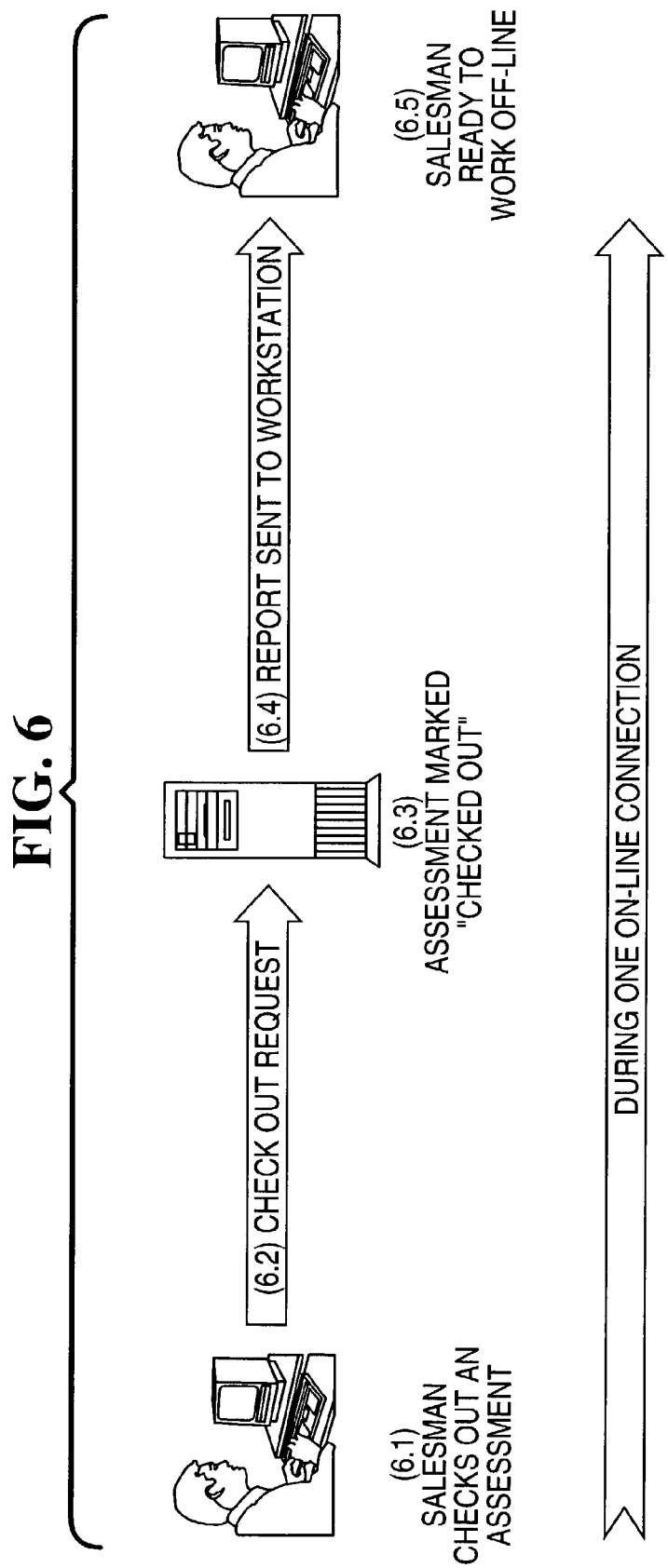
FIG. 6 illustrates the process for checking out an assessment from the BIM server to a salesperson's workstation in accordance with the present invention.
Figure 7:
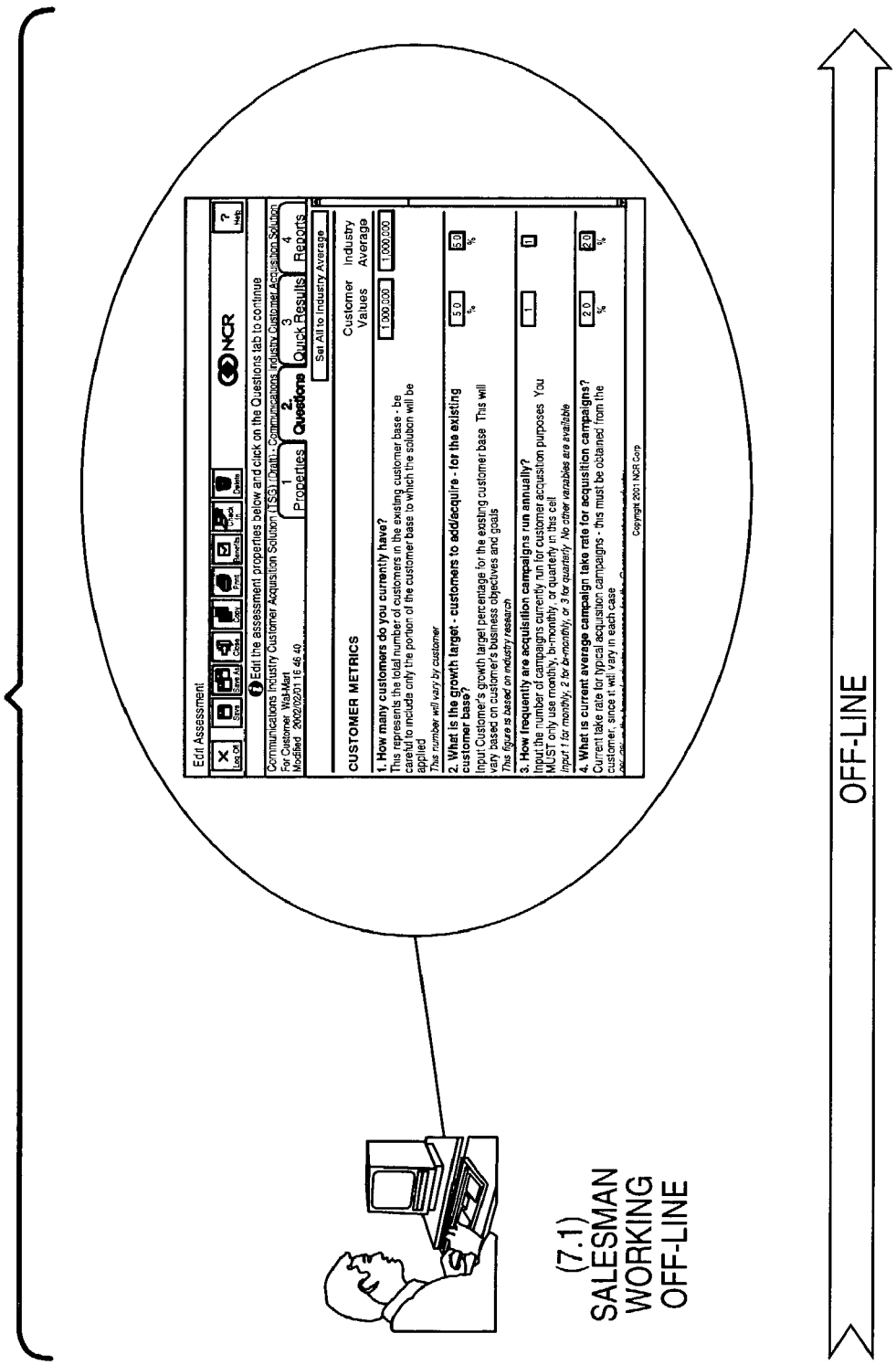
FIG. 7 illustrates the process for entering customer information, updating a checked-out assessment, and calculating assessment results while offline in accordance with the present invention.

The Desktop BIM system enables a salesperson to enter customer values, calculate results and produce reports—all while offline. Utilization of the Desktop BIM system to create a customer assessment and generate business impact results involves 3 steps, illustrated in FIGS. 6 through 8.

FIG. 6

Checking Out an Assessment from the Server to His Workstation

During an on-line connection, the salesperson checks out a previously created assessment (steps 6.1 and 6.2). The assessment is marked "checked-out", and made uneditable on the BIM server (step 6.3) pending its return. The assessment is also downloaded to the salesperson's desktop computer or connected laptop computer for work offline (steps 6.4 and 6.5).

FIG. 7

Modifying the Assessment by Entering Customer Values, Calculating Results and Producing Reports While offline, the salesperson may launch the Desktop BIM system to work with their checked out assessments (step 7.1). The Desktop BIM system employs a user interface 701 that is very similar to the online web interface. The salesperson can open an assessment, change customer values, see quick results, produce Word and PowerPoint reports, etc. Ultimately, they must mark the assessment to be "checked in" in order to declare that they no longer need to work with the assessment offline.

FIG. 8

Checking the Modified Assessment Back in

When the salesperson next logs in to the BIM online system (step 8.1), any assessments to be checked in are removed from their desktop computer and relocated to the BIM server (steps 8.2 and 8.3). The uploaded assessments can now be worked online with on the BIM server as usual.

The information contained in the Business Impact Models, and the information collected during the preparation of assessments for potential customers is highly sensitive and must be safeguarded to prevent deliberate or accidental disclosure to data warehouse solution competitors or others. Administrative tool 145 provides a BIM administrator with the ability to authorize and de-authorize individual users to use the Desktop BIM system, or to exclude certain business impact models from being used by any user in the Desktop BIM system. Administrative tool 145 further provides for the limit the duration of time a BIM assessment may be checked out or the number of BIM assessments that a user may have checked out at one time.

There may be BIM assessments whose calculations are so sensitive that the data warehouse solution provider would not want the assessments from being run on an off-line PC and risk exposing the assessments to theft or, misuse. Accordingly, the BIM administrator may make these BIM assessments unavailable for download through the Desktop BIM system.

The process for checking out a BIM assessment is initiated by selecting a "Check Out" button 407 presented as part of the web browser BIM interface window shown in FIGS. 4 and 5. This button is not part of the original online system, but has been added to support the Desktop BIM System. After a user has enabled his PC, he will be able to check assessments out to the Desktop BIM system after opening them on the web, if authorized. The Check Out button will be absent if the user is not authorized to use the Desktop BIM system, or will be disabled if the user is authorized, but not enabled on the PC currently being used to access the BIM system. The button 407 will be enabled if the user is authorized and enabled on the PC being used.

If enabled, the button will be usable from any of the four tabs of an open assessment. Pressing the check out button will cause the current assessment and its BIM to be downloaded to the appropriate configuration on the user's PC. If the assessment is for a BIM that is not permitted to be used off-line, then pressing the button will produce an error message.

When an assessment is checked out, the BIM assessment calculations and reports must also be loaded onto the user's PC. This will be done in a secure way such that the details of the BIM's workbook are never visible. An optional feature would be to allow the user to selectively download only some of an assessment's available reports. E.g., if a user knew that they did not need any of an assessment's available PowerPoint presentations, this feature would allow them to avoid the additional download time needed to transfer the presentations from the web to the user's PC.

CONCLUSION

The Figures and description of the invention provided above reveal a new and useful system and method for assessing and predicting data warehouse solution requirements for a business or organization implementing a data warehouse solution. The system and method are implemented on a secure computer system and include the capability to collect customer information and perform data warehouse solution evaluations on an offline desktop or notebook computer.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A modeling tool for determining the impact that a data warehouse solution will have upon a business organization considering implementing said data warehouse solution, said modeling tool comprising:
    a server computer including:
        at least one business impact model comprising a mathematical representation of a data warehouse solution, said business impact model including an assessment questionnaire, said assessment questionnaire including a plurality of questions relating to said business organization considering implementing said data warehouse solution; and
        a business impact modeling application for calculating a value of said data warehouse solution to said business organization from said business impact model and answers provided to said assessment questions;
    a client computer electronically connectable to said server computer for receiving a copy of said at least one business impact model, said client computer providing offline collection of answers to said assessment questions and offline calculation of said value of said data warehouse solution to said business organization from said copy of said business impact model and answers provided to said assessment questions; and
    an application residing on said server computer for keeping a record of copies of said at least one business impact model received by said client computer.

2. The modeling tool in accordance with claim 1, wherein:
    said client computer communicates with said server computer through a web browser application.

3. The modeling tool in accordance with claim 1, wherein:
    access by said client computer to said at least one business impact model residing on said server computers server computer is restricted by a security application that limits access to said business impact modeling application and said business impact models to selected users.

4. The modeling tool in accordance with claim 1, wherein:
    said value of said data warehouse solution calculated by said business impact modeling application includes at least one of the group including:
    revenue enhancement estimate,
    expense reduction estimate,
    gross margin improvement estimate,
    profit improvement estimate, and
    return on investment estimate.

5. The modeling tool in accordance with claim 1, wherein:
    said client computer comprises a notebook computer.

6. A modeling tool for determining data warehouse solution requirements for a business organization considering implementing a data warehouse solution, said modeling tool comprising:
    a server computer including:
        at least one business impact model comprising a mathematical representation of a data warehouse solution, said business impact model including an assessment questionnaire, said assessment questionnaire including a plurality of questions relating to said a business organization considering implementing said data warehouse solution; and
        a business impact modeling application for determining data warehouse solution requirements for said a business organization from said business impact model and answers provided to said assessment questions;
    a client computer electronically connectable to said server computer for receiving a copy of said at least one business impact model, said client computer providing offline collection of answers to said assessment questions and offline calculation of said value of said data warehouse solution to said business organization from said copy of said at least one business impact model and answers provided to said assessment questions; and an application residing on said server computer for keeping a record of copies of said at least one business impact model received by said client computer.

7. The data warehouse solution modeling tool in accordance with claim 6, wherein:

said client computer communicates with said server computer through a web browser application.

8. The data warehouse solution modeling tool in accordance with claim 6, wherein:

access by said client computer to said at least one business impact model residing on said server computers server computer is restricted by a security application that limits access to said business impact modeling application and said business impact models to selected users.

9. The data warehouse solution modeling tool in accordance with claim 6, wherein:

said client computer comprises a notebook computer.

10. A method for determining the impact that a data warehouse solution will have upon a business organization considering implementing said data warehouse solution, the steps comprising:

at a server computer, providing at least one business impact model comprising a mathematical representation of a data warehouse solution, said business impact model including an assessment questionnaire, said assessment questionnaire including a plurality of questions relating to said a business organization considering implementing said data warehouse solution; and at said server computer providing a business impact modeling application for calculating a value of said data warehouse solution to said a business organization from said business impact model and answers provided to said assessment questions;

connecting a client computer through a communication network to said server computer and downloading a copy of said at least one business impact model from said server computer to said client computer;

at said server computer, maintaining a record of copies of said at least one business impact model received by said client computer; and at said client computer, while said client computer is unconnected from said communication network, collecting answers to said assessment questions and calculating said value of said data warehouse solution to said business organization from said copy of said at least one business impact model and the answers provided to said assessment questions.

11. The method in accordance with claim 10, wherein:

said client computer communicates with said server computer through a web browser application.

12. A method in accordance with claim 10, further comprising the step of:

limiting access to said business impact modeling application and said business impact models to selected users.

13. The method in accordance with claim 10, wherein:

said value of said data warehouse solution calculated by said business impact modeling application includes at least one of the group including:

revenue enhancement estimate, expense reduction estimate, gross margin improvement estimate, profit improvement estimate, and return on investment estimate.

14. A method for determining data warehouse solution requirements for a business organization considering implementing a data warehouse solution, the steps comprising:

at a server computer, providing at least one business impact model comprising a mathematical representation of a data warehouse solution, said business impact model including an assessment questionnaire, said assessment questionnaire including a plurality of questions relating to said a business organization considering implementing said data warehouse solution; and at said server computer providing a business impact modeling application for determining the data warehouse solution requirements of said organization from said business impact model and answers provided to said assessment questions;

connecting a client computer through a communication network to said server computer and downloading a copy of said at least one business impact model from said server computer to said client computer;

at said server computer, maintaining a record of copies of said at least one business impact model received by said client computer; and at said client computer, while said client computer is unconnected from said communication network, collecting answers to said assessment questions and determining the data warehouse solution requirements of said organization from said copy of said at least one business impact model and the answers provided to said assessment questions.

15. The method in accordance with claim 14, wherein:

said client computer communicates with said server computer through a web browser application.

16. A method in accordance with claim 14, further comprising the step of:

limiting access to said business impact modeling application and said business impact models to selected users.

17. The method for determining data warehouse solution requirements for a business organization considering implementing a data warehouse solution in accordance with claim 14, wherein:

said value of said data warehouse solution calculated by said business impact modeling application includes at least one of the group including:

revenue enhancement estimate, expense reduction estimate, gross margin improvement estimate, profit improvement estimate, and return on investment estimate.

18. The method for determining data warehouse solution requirements for a business organization considering implementing a data warehouse solution in accordance with claim 14, further comprising the step of:

copying said assessment report from said client computer to said personal digital assistant.

* * * * *